April 28, 1953 W. PALMER 2,636,988

SYNCHRONIZER

Filed Feb. 2, 1949 2 SHEETS—SHEET 1

INVENTOR
WINSLOW PALMER
BY
Herbert H. Thompson
HIS ATTORNEY

April 28, 1953 W. PALMER 2,636,988

SYNCHRONIZER

Filed Feb. 2, 1949 2 SHEETS—SHEET 2

INVENTOR
WINSLOW PALMER
BY Herbert H. Thompson
HIS ATTORNEY.

Patented Apr. 28, 1953

2,636,988

UNITED STATES PATENT OFFICE 2,636,988

SYNCHRONIZER

Winslow Palmer, West Hempstead, N. Y., assignor to The Sperry Corporation, a corporation of Delaware Application February 2, 1949, Serial No. 74,218

18 Claims. (Cl. 250—36)

This invention relates to automatic synchronizer circuits and particularly to apparatus for generating and synchronizing a series of pulses in predetermined time-phase relation with recurrent control pulses.

Systems for synchronizing the wave form of an oscillator with a periodic series of recurrent pulses are known in the prior art. Generally such systems are complex and are adversely affected by random noise signals or by changes in the amplitude of the control pulses.

It is an object of this invention to provide a simplified apparatus for automatically synchronizing a series of pulses in predetermined time-phase relation with recurrent control pulses wherein the synchronization is not adversely affected by random noise signals or by changes in the amplitude of the control pulses.

An additional object of this invention is to provide a simplified apparatus for automatically synchronizing a high frequency oscillator with a low frequency series of pulses.

A further object of this invention is to provide apparatus for automatically synchronizing the sweep of the beam of a cathode-ray tube with electromagnetic energy pulses derived from the master station of a Loran system.

Figures 1, 2:
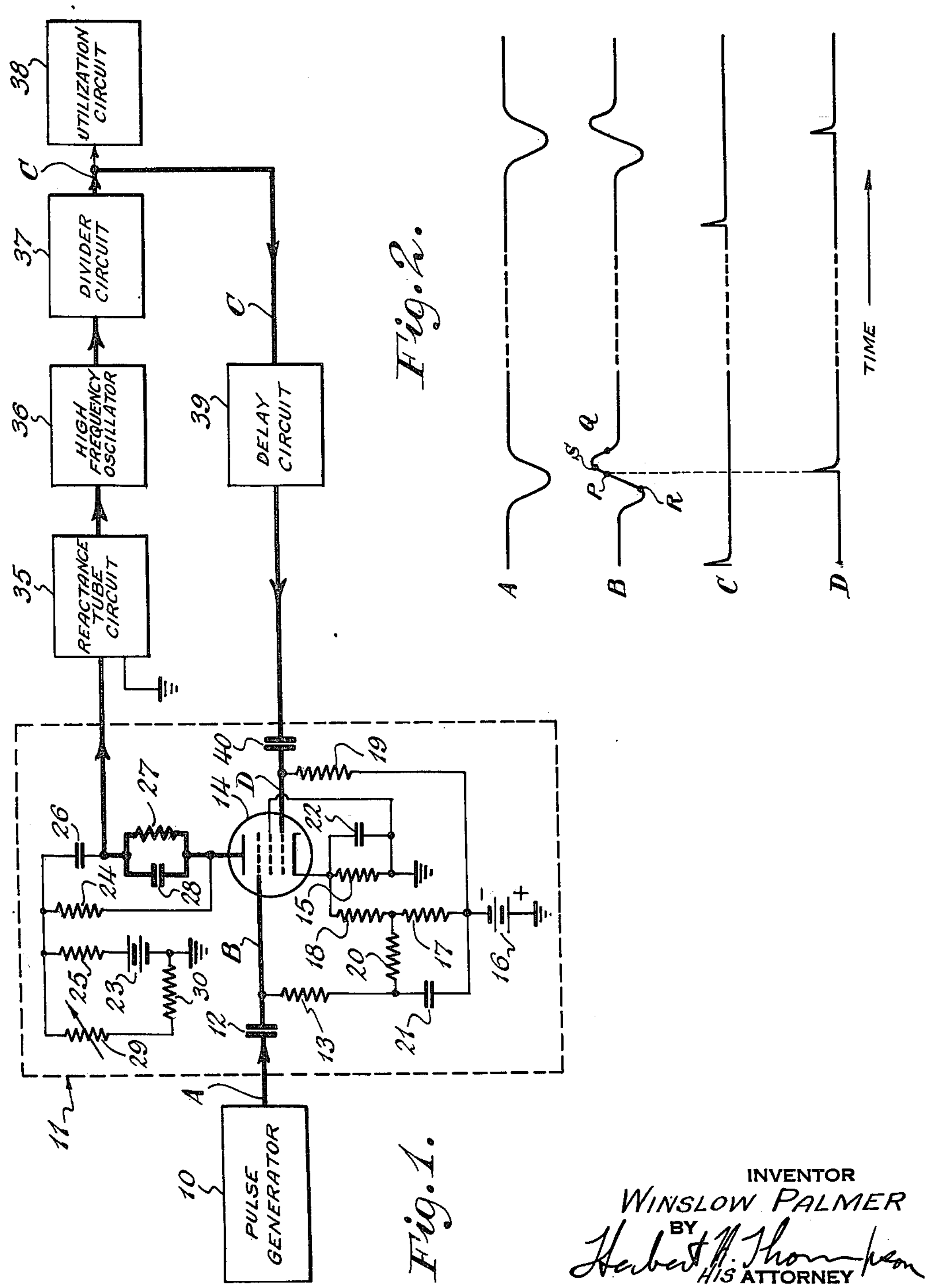
Figure 3:
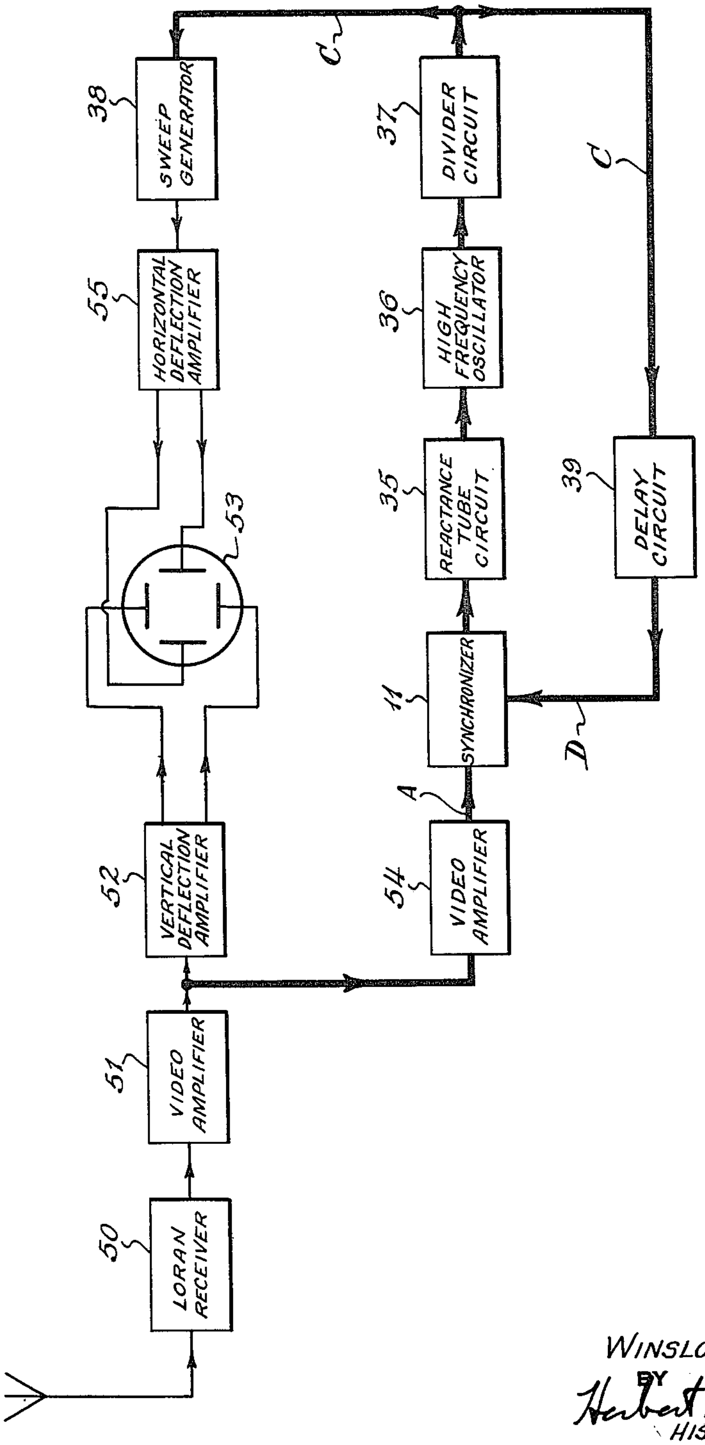

Further objects and advantages of the invention will be apparent from the following description, the appended claims, and the drawings, in which, Fig. 1 is a schematic diagram of the synchronizer circuit and block diagrams of conventional circuits associated therewith;

Fig. 2 indicates various curves representing the wave form of and time relationship between signals which occur in various parts of the apparatus shown in Fig. 1; and Fig. 3 is a block diagram indicating a Loran receiving system employing the synchronizer.

The objects of this invention are attained by synchronizing a high frequency oscillator with a low frequency series of unidirectional pulses which may be the output pulses of a Loran receiver. A differentiating network is employed at the input of the synchronizer to convert each of the low frequency pulses to a bidirectional pulse, and the bidirectional pulses are applied to the Number 3 grid of a multigrid tube. The tube is biased to cutoff. A series of pulses which are of the same frequency as the low frequency series of pulses is generated, each pulse being generated in response to a predetermined number of cycles of oscillation of the high frequency oscillator, and these pulses are delayed a fixed time and then applied to the control grid of the synchronizer tube in such manner that each pulse serves to remove the cutoff bias for the duration of the pulse. The plate current for the synchronizer tube is supplied through a relatively large time-constant network and the combined effect of the signals which are applied to the Number 3 and control grids of the synchronizer tube on the current flowing through the tube is employed to cause the large time-constant network to produce a voltage which serves to control the frequency of the high frequency oscillator. Manual means is provided for initially bringing the series of delay unidirectional pulses into coincidence with the series of low frequency pulses.

In the discussion of the preferred embodiment of this invention which follows, frequent reference will be made to Fig. 2 which indicates the wave form of and time relations between the various signals which occur in the apparatus disclosed in Fig. 1. It should be observed that the letter which identifies each curve in Fig. 2 is also employed in Fig. 1 to identify the connection between the circuit elements which carries the corresponding signal.

Referring now to Figs. 1 and 2, pulse generator 10 serves to produce a series of pulses A which are of short duration with respect to the repetition period. The pulse generator may be a Loran receiver as indicated in Fig. 3, for example.

Pulses A are applied to the synchronizer circuit 11 through condenser 12 which in combination with resistor 13 comprises a differentiating circuit. This differentiating circuit serves to convert each of the pulses A to a signal B which is of negative polarity during a portion of the period of the pulse and of positive polarity during the remainder of the period of the pulse. Signal B is applied to the Number 3 grid of vacuum tube 14, it being noted that signal B constitutes a series of singular alternating cycles which are spaced at regular time intervals corresponding to the intervals between each of the pulses A.

Tube 14 is a sharp-cutoff multigrid type which is biased to cutoff by the voltage drop across resistors 17 and 18 due to the current which flows from battery 16 through resistors 17, 18 and 15 to ground. Resistor 19 is of high resistance and serves to connect the control grid of tube 14 to the negative terminal of battery 16. The screen grid of tube 14 is connected to the positive terminal of battery 16, and the Number 3 grid of the tube is normally at a small negative potential with respect to the cathode of the tube since it is connected through resistors 13 and 20 to the junction between divider resitsors 17 and 18. Condenser 21 serves as a high frequency by-pass between resistors 13 and 20 and the negative terminal of battery 16, and condenser 22 serves as a high frequency by-pass between the cathode of tube 14 and ground.

The plate of tube 14 is connected to battery 23 through resistors 24 and 25. Condenser 26 is connected in series with a stabilizer network which is a low time-constant circuit comprising resistor 27 and condenser 28 connected in parallel. Serially connected condenser 26 and the stabilizer network are connected across resistor 24. The combination of resistor 24 and condenser 26 is a large time-constant and integrating network smoothing out voltage variations in its output. Resistor 25 and serially connected resistor 30 and variable resistor 29 comprise a voltage divider across battery 23 so that the plate voltage applied to tube 14 through the large time-constant network is controlled by the setting of resistor 29.

The voltage developed between ground and the junction between condenser 26 and stabilizer network 27, 28 is applied to a conventional reactance tube circuit 35.

The output of reactance tube circuit 35 is applied to a conventional high frequency oscillator 36 and serves to control the frequency of the oscillator. Oscillator 36 is preferably a type which has high frequency stability, as for example, a piezo-electric oscillator. The frequency of oscillator 36 is a multiple of the frequency of pulses A and is adjustable within the frequency range of pulses A.

The output of oscillator 36 is applied to divider circuit 37 which serves to generate pulses C at a frequency equal to the frequency of pulses A. The divider circuit may be a conventional gas tube counting circuit, for example, which is adapted to generate pulses at a frequency which is a fraction of the frequency of oscillator 36.

The output C of divider circuit 37 is applied to utilization circuit 38 and delay circuit 39. The utilization circuit may be the sweep generator for a Loran receiver, for example.

Delay circuit 39 serves to delay pulses C by a time equal to the difference in time between the instant each signal B changes from negative to positive and the instant each pulse C is initiated. This delay is determined by the time prior to signal B at which it is desired to apply pulses C to the utilization circuit. The delay circuit may be a conventional delay network composed of lumped impedances or it may be a conventional "one shot" multivibrator, for example. In the latter example the rectangular pulse of the multivibrator must be applied to a differentiating network in order to produce delayed pulses of short duration. Such a differentiating network may be incorporated in the multivibrator circuit, or resistor 19 and coupling condenser 40 may be proportioned so as to serve as a differentiating network.

Delay circuit 39 may be omitted if it is desired to produce pulses C at the instant signal B changes from negative to positive.

Pulses D have a period appreciably less than one-half the period of signals B and are applied to the control grid of tube 14 to reduce or remove the bias between the control grid and cathode of the tube and thereby permit a pulse of current to flow between the anode and cathode of the tube during each pulse.

The stabilizer network comprising resistor 27 and condenser 28 is serially connected in the feedback circuit between the plate and control grid of tube 14 and serves to prevent the feedback circuit from oscillating. The resistor and condenser are proportioned in order to attain this result in accordance with well-known feedback theory.

Suitable circuit constants for the synchronizer circuit shown in Fig. 1 employing a type 6AS6 tube in a system in which pulses A are of approximately 50 microseconds duration at the half-power point and recur at a frequency of 25 pulses per second are as follows:

| | | |
|---|---|---|
| C12 | mmfd | 240 |
| C21 | mfd | 0.1 |
| C22 | mfd | 0.1 |
| C26 | mfd | 3.0 |
| C28 | mfd | 0.1 |
| C40 | mmfd | 24 |
| R13 | ohms | 200,000 |
| R15 | do | 100,000 |
| R17 | do | 5,000 |
| R18 | do | 5,000 |
| R19 | megohm | 1 |
| R20 | ohms | 100,000 |
| R24 | megohms | 10 |
| R25 | ohms | 110,000 |
| R27 | do | 510,000 |
| R29 | do | 5,000 |
| R30 | do | 6,000 |
| V16 | volts | 105 |
| V23 | do | 150 |

A suitable oscillator frequency is 100 kilocycles and in this case the divider 37 generates a pulse in response to each 4000 oscillations of the oscillator.

Each pulse of plate current which flows through tube 14 is supplied by the charge on condenser 26 and, since the condenser is part of a high time-constant network, the voltage applied to the plate of tube 14 and to reactance tube circuit 35 is proportional to the average magnitude of the pulses of plate current.

Thus, the voltage applied to reactance tube circuit 35, and hence the frequency of pulses D, is determined by the average magnitude of the pulses of current which flow through tube 14 and by the setting of variable resistor 29. When the voltage applied to reactance tube circuit 35 is made more positive, the reactance of circuit 35 increases and the increased reactance applied to oscillator 36 causes the frequency of oscillator 36 to decrease, thereby decreasing the frequency of pulses D. It follows that the frequency of pulses D is increased when the voltage applied to reactance tube circuit 35 is decreased.

In operation, when the apparatus is energized, pulses D may occur initially in any arbitrary time relation to signals B depending upon the setting of variable resistor 29. When pulses D do not occur coincident with signals B, tube 14 draws pulses of plate current of equal magnitude in response to pulses D and the voltage applied to reactance tube circuit 35 is substantially constant. For this condition the frequency of pulses D is determined by the setting of variable resistor 29 and signals B have no effect since they occur during the intervals of time in which tube 14 is biased to cutoff.

Thus it is necessary to cause pulses D to occur coincident with signals B before synchronization can be effected by synchronizer 11. If the frequency of pulses D is slightly different from the frequency of signals B, the two pulses will occur in coincidence after a certain number of cycles of operation. However, it is usually more expedient to adjust resistor 29 in an arbitrary manner until pulses D occur coincident with signals B.

Fig. 2 shows the time relations between the various pulses when the setting of resistor 29 is such that pulses D are caused to occur at point P. For this condition, if pulses D occur during the portions of signals B to the left of point P the combined effect of signals B and pulses D upon the magnitude of the pulses of plate current is to decrease the frequency of pulses D and cause pulses D to occur at point P after a few cycles of operation.

Point Q indicates the point on the curve representing signals B at which the pulse B under consideration is of the same magnitude and polarity as at point P. If signals D occur during the portion of signals B which occurs between points P and Q, the combined effect of signals B and pulses D upon the magnitude of the pulses of plate current is to increase the frequency of pulses D and cause pulses D to occur at point P after a few cycles of operation.

If pulses D initially occur during the portion of signal B to the right of point Q the combined effect of signals B and pulses D upon the magnitude of the pulses of plate current is to decrease the frequency of pulses D. Therefore, no synchronization is effected for this condition and it is necessary to adjust resistor 29 until pulses D are caused to occur during the portions of signals B to the left of point Q.

The circuit constants are proportioned so that as resistor 29 is changed from minimum to maximum resistance the point P at which synchronization is effected is shifted along the curve representing signals B from point R to point S. When point P appears during the negative portion of signals B, point Q will appear on the initial leg of the cycle at the point at which the initial leg is of the same magnitude as at point P. For this condition, if pulses D occur during the portions of signals B to the left of point Q no synchronization is effected. If pulses D occur during the portions of signals B to the right of point Q, the combined effect of signals B and pulses D upon the magnitude of the pulses of plate current is to cause pulses D to occur at point P after a few cycles of operation.

If point P appears at the point at which signals B change from negative to positive synchronization is effected if pulses D occur during any portion of signals B, and pulses D are caused to occur at the cross-over points of signals B.

The function of synchronizer 11 is substantially independent of the amplitude of pulses A. If pulses A are temporarily interrupted, the frequency of pulses D is slowly changed to correspond to the frequency which is determined by the setting of variable resistor 29. If the interruption is momentary, synchronism is restored immediately after the interruption. If pulses A are interrupted for a substantial time and then restored, pulses D are under normal conditions still coincident with pulses B because of the setting of variable resistor 29 and synchronizer 11 causes exact synchronism to be restored.

When noise signals are introduced to synchronizer 11 along with pulses A the system remains in synchronism under ordinary circumstances. The differentiating network at the input of synchronizer 11 serves to convert all unidirectional components which are applied to the input of synchronizer 11 to bidirectional components, and, as a result, the function of synchronizer 11 is appreciably affected only by an appreciable number of pulses coincident with pulses A. Noise and non-synchronous pulses, being random with respect to pulses A, will have zero net effect on synchronization.

It is to be observed that the synchronizer is not limited to use with the type $$\frac{\sin x}{x}$$

incident pulses as indicated at A in Fig. 2. The incident pulses may be any type from which suitable signals B can be derived. The synchronizer will function satisfactorily when signals B are any type signals which change from negative to positive polarity once during the period of each incident pulse A. Thus it is apparent that signals B need not be symmetrical.

Referring now to Fig. 3 where an application of this invention to a Loran receiving system is shown, a conventional Loran receiver 50 serves to detect the recurring electromagnetic pulses produced by a Loran transmitting system. The detected pulses are amplified by video amplifier 51 and vertical deflection amplifier 52 and applied to the vertical deflection plates of cathode-ray tube 53.

In order to synchronize the horizontal sweep of the beam of the cathode-ray tube with the pulses produced by the master Loran transmitting station, a portion of the signal which is detected by receiver 50 and amplified by amplifier 51 is applied to video amplifier 54 which produces pulses A which are in turn applied to synchronizer 11.

As discussed above with reference to Fig. 1, the combined action of synchronizer 11, reactance tube circuit 35, high frequency oscillator 36, divider circuit 37, and delay circuit 39 is to produce pulses C which occur a predetermined time prior to pulses A.

Pulses C are applied to sweep generator 38 which serves to generate in response to each pulse C a voltage excursion which increases in a linear manner with respect to time. These voltage excursions are applied to horizontal deflection amplifier 55 where they are amplified and then applied to the horizontal deflection plates of cathode-ray tube 53.

In this manner each horizontal sweep of the beam of cathode-ray tube 53 is automatically synchronized with each pulse received from the master station of the Loran transmitting system, and each sweep is initiated at a predetermined time prior to each pulse received.

Although specific embodiments of this invention have been shown and described, it will be apparent that various modifications may be made therein without departing from the scope thereof as defined by the appended claims.

What is claimed is:

1. Apparatus for synchronizing a series of pulses with recurrent unidirectional control pulses, comprising an input circuit for said recurrent pulses, a differentiating circuit connected to said input circuit for converting said recurrent control pulses to bidirectional pulses, a generator for producing a series of unidirectional pulses, each pulse of said series having a period less than one-half the period of said bidirectional pulses, and phase comparator means responsive to said series of pulses and said bidirectional pulses for controlling the frequency of the pulses produced by said generator and maintaining said series of pulses in predetermined time-phase relation to said bidirectional pulses.

2. Apparatus for synchronizing a series of pulses with recurrent unidirectional control pulses, comprising an input circuit for said control pulses, a differentiating circuit connected to said input circuit for converting said control pulses to bidirectional pulses, a generator for producing a series of unidirectional pulses, each pulse of said series having a period less than one-half the period of said bidirectional pulses, means for delaying the pulses of said series a predetermined time, means for initially causing said delayed pulses to occur coincident in time with said bidirectional pulses, and phase comparator means responsive to said delayed pulses and said bidirectional pulses for controlling the frequency of the pulses produced by said generator and causing said delayed pulses to continue to occur coincident with said bidirectional pulses.

3. Apparatus for synchronizing a series of pulses with recurrent unidirectional pulses, comprising an input circuit for said recurrent pulses, means connected to said input circuit for converting said recurrent pulses to bidirectional pulses, a source of potential and an impedance serially connected for producing a control voltage, a generator for producing a series of unidirectional pulses, said generator including a frequency control circuit, the frequency-control circuit of said generator being connected to said serially connected source of potential and impedance and responsive to the magnitude of said control voltage, each of the pulses of said series having a period less than one-half the period of said bidirectional pulses, means for delaying the pulses of said series a predetermined time, means for initially causing said delayed pulses to occur coincident with said bidirectional pulses, and phase comparator means responsive to said bidirectional pulses and said delayed pulses for controlling the magnitude of said control voltage and causing said delayed pulses to continue to occur coincident with said bidirectional pulses.

4. The apparatus of claim 3, wherein said impedance is a large time-constant network.

5. In combination, a source of recurrent unidirectional pulses, a differentiating circuit connected to said source, a source of potential and a large time-constant network serially connected for producing a control voltage, a generator for producing a series of pulses, the frequency of said series being controlled by the magnitude of said control voltage and the period of each pulse of said series being appreciably less than one-half the period of said recurrent pulses, means for delaying the pulses of said series a predetermined time, means for initially causing said delayed pulses to occur coincident in time with said recurrent pulses, a unilateral electron discharge device, means connecting said control voltage between the anode and cathode of said discharge device, means for controlling the current flowing through said discharge device by comparing the time-phase of said delayed pulses and the pulses produced by said differentiating circuit thereby controlling the magnitude of said control voltage and causing said delayed pulses to continue to occur coincident with said recurrent pulses, and means for utilizing said series of pulses.

6. In combination, a source of recurrent bidirectional pulses which change in polarity once during each pulse, a source of potential and a high time-constant network serially connected for producing a control voltage, a generator for producing a series of pulses, said generator including a freqency control circuit, the frequency-control circuit of said generator being connected to said serially connected source of potential and network and the frequency of said series being controlled by the magnitude of said control voltage, the period of each pulse produced by said generator being less than one-half the period of said bidirectional pulses, means for delaying the pulses of said series a predetermined time, means for initially causing said delayed pulses to occur coincident in time with said bidirectional pulses, a unilateral electron discharge device, means connecting said control voltage between the anode and cathode of said discharge device, means for controlling the current flowing through said discharge device by comparing the time-phase of said delayed pulses and said bidirectional pulses, thereby controlling the magnitude of said control voltage and causing said delayed pulses to continue to occur coincident with said recurrent pulses, and means for utilizing said series of pulses.

7. In combination, a source of recurrent unidirectional control pulses, a differentiating circuit connected to said source for converting said pulses to bidirectional pulses which change polarity at least once during each pulse, a source of potential and a high time-constant impedance serially connected for producing a control voltage, a generator for producing a series of pulses, said generator including a frequency control circuit, the frequency-control circuit of said generator being connected to said serially connected source of potential and impedance and responsive to said control voltage whereby the frequency of said series is determined by the magnitude of said control voltage, the period of each pulse of said series being less than one-half the period of said control pulses, means for delaying the pulses of said series a predtermined time, means for initially causing the delayed pulses to occur coincident with said control pulses, a multigrid vacuum tube supplied with plate current through said impedance, means for biasing said tube to cutoff, means for applying said delayed pulses to the control grid of said tube and causing a pulse of current to flow through said tube during each of said delayed pulses, means for applying said bidirectional pulses to another grid of said tube, thereby controlling the amplitude of said pulses of current and the magnitude of said control voltage and causing said delayed pulses to continue to occur coincident with said control pulses, and means for utilizing said series of pulses.

8. In combination, a source of recurring control pulses, means for converting said control pulses to bidirectional pulses which change in polarity once during each pulse, a pentode vacuum tube, a source of potential and a high time-constant network serially connected and having positive and negative output terminals for producing a control voltage, means connecting said positive and negative terminals respectively to the anode and cathode of said tube, means for biasing said tube to cutoff, a source of potential for maintaining the screen grid of said tube at a fixed positive potential with respect to said cathode, a generator for producing a series of pulses, the frequency of said series of pulses being adjustable within the frequency range of said control pulses and being determined by the magnitude of said control voltage, the period of each pulse of said series being less than one-half the period of said control pulses, a delay circuit for delaying the pules of said series of pulses a predetermined time, means for applying said delayed pulses to the control grid of said tube and thereby causing a pulse of current to flow through said tube during each pulse of said delayed pulses, means for initially causing said delayed pulses to occur coincident with said bidirectional pulses, means for applying said bidirectional pulses to the suppressor grid of said tube, thereby controlling the magnitude of said pulses of current and the magnitude of said control voltage and causing said delayed pulses to continue to occur coincident with said bidirectional pulses, and means for utilizing said series of pulses.

9. In combination, a source of low frequency pulses, means for converting said pulses to bidirectional pulses which change in polarity at least once during each pulse, a source of potential and an impedance serially connected for producing a control voltage, a high frequency oscillator, said oscillator including a frequency control circuit, the frequency control circuit of said oscillator being connected to said serially connected source of potential and impedance and the frequency of said oscillator being determined by the magnitude of said control voltage, means connected to said oscillator for producing a series of pulses, each pulse of said series being produced in response to a predetermined number of oscillations of said oscillator and having a period less than one-half the period of said bidirectional pulses, means for delaying said series of pulses a predetermined time, means for initially causing said delayed pulses to occur coincident in time with said bidirectional pulses, and phase comparator means responsive to said delayed pulses and said bidirectional pulses for controlling the magnitude of said control voltage and causing said delayed pulses to continue to occur coincident with said bidirectional pulses.

10. The combination of claim 9, wherein said impedance is a large time-constant network.

11. In combination, a source of recurrent unidirectional pulses, a differentiating circuit connected to said source for converting said pulses to bidirectional pulses, a variable reactance circuit, an oscillator connected to said reactance circuit and adapted to produce oscillations harmonically related to said recurrent pulses, the frequency of said oscillations being determined by the reactance of said reactance circuit, means responsive to said oscillations for producing a series of pulses at the frequency of said recurrent pulses, each pulse having a period less than one-half the period of said bidirectional pulses, means for delaying said series of pulses a predetermined time, means for initially causing said delayed pulses to occur coincident in time with said bidirectional pulses, and phase comparator means connected to said differentiating circuit responsive to said delayed pulses and said bidirectional pulses for controlling the reactance of said variable reactance circuit and causing said delayed pulses to continue to occur coincident with said bidirectional pulses.

12. In combination, a source of recurrent unidirectional pulses, a differentiating circuit connected to said source, a source of potential and a large time-constant circuit serially connected and having positive and negative output terminals for producing a control voltage, a generator for producing a series of pulses, said generator including a frequency control circuit, the frequency-control circuit of said generator being connected to said serially connected source of potential and large time-constant circuit and the frequency of said series being controlled by the magnitude of said control voltage, the period of each pulse of said series being less than one-half the period of said recurrent pulses, means for initially causing the pulses of said series to occur coincident in time with said recurrent pulses, a unilateral electron discharge device, means connecting said positive and negative terminals respectively to the anode and cathode of said discharge device, means for controlling the current flowing through said discharge device by comparing the time-phase of the pulses of said series and said recurrent pulses, thereby controlling the magnitude of said control voltage and causing said series of pulses to continue to occur coincident with said recurrent pulses, and means for utilizing said series of pulses.

13. In combination, an input circuit adapted to be connected to means for producing a first series of pulses, a differentiating circuit connected to said input circuit, a pulse generator for producing a second series of pulses, said pulse generator including a frequency control circuit, a pulse-triggered phase comparator having an output circuit and a pair of input circuits, means connecting the output of said pulse generator to one of the input circuits of said pair of input circuits, means connecting the output of said differentiating circuit to the other input circuit of said pair of input circuits, and means connected between the output circuit of said pulse-triggered phase comparator and the frequency control circuit of said pulse generator for controlling the frequency of the pulses produced by said generator.

14. In combination, a multi-grid vacuum tube having an anode, a cathode, and two input circuits, one of said input circuits comprising a differentiating network which is adapted to receive a first series of recurrent unidirectional pulses, a generator for producing a second series of recurrent unidirectional pulses, said generator having an output circuit coupled to the other input circuit of said vacuum tube, an integrating circuit connected in the current path between the anode and cathode of said tube, and means connected between said integrating circuit and said generator for varying the repetition rate of said second series of pulses in accordance with the integrated output of said vacuum tube and thereby maintaining said second series of pulses in predetermined time-phase relation to said first series of pulses.

15. The combination as defined in claim 14 wherein said tube is biased to anode current cut-off in absence of input pulses from said pulse generator.

16. In combination a pulse-triggered phase comparator having first and second input circuits and an output circuit, first and second signal circuits supplying first and second series of recurrent unidirectional pulses, means connected intermediate said first signal circuit and said first input circuit for receiving said first series of pulses and supplying to said first input circuit a series of singular alternating cycles spaced at regular intervals corresponding to the intervals between pulses of said first series of recurrent unidirectional pulses, means coupling said second signal circuit to said second input circuit, and means responsive to the output current of said pulse-triggered phase comparator for selectively advancing or retarding the timing of the pulses of one of said series of recurrent unidirectional pulses accordingly as the time integration of the output of said pulse-triggered comparator is positive or negative.

17. The combination as defined in claim 16, wherein the duration of pulses of said first series is short with respect to the time interval therebetween, wherein the duration of pulses of said first series is appreciably greater than the duration of pulses of said second series, and wherein said means connected intermediate said first signal circuit and said first input circuit of said phase comparator comprises a differentiating circuit.

18. Apparatus for receiving a first series of widely separated recurrent unidirectional signal pulses from a first signal source and a second series of widely separated recurrent unidirectional pulses of appreciably shorter duration from a second signal source and providing an output voltage varying according to the timing relation between the pulses of said first series and the pulses of said second series, said apparatus comprising: a pulse-triggered phase comparator having first and second input circuits and an output circuit, differentiating means connected to said first input circuit for receiving said first series of recurrent unidirectional pulses and supplying to said first input circuit a series of singular alternating cycles spaced at regular intervals corresponding to the intervals between pulses of said first series, the second input circuit of said phase comparator comprising means for receiving said second series of recurrent unidirectional pulses, said phase comparator being conducting for the duration of each received pulse of said second series and non-conducting for the interval therebetween, said output circuit comprising means for providing an output voltage varying according to the timing relation between said series of singular alternating cycles and the pulses of said second series thereby providing a source of control voltage for maintaining said second series of pulses in predetermined time-phase relation with said first series of pulses.

WINSLOW PALMER.

References Cited in the file of this patent

UNITED STATES PATENTS

| Number | Name | Date |
|---|---|---|
| 2,096,881 | Butler | Oct. 26, 1937 |
| 2,200,103 | Shutt | May 7, 1940 |
| 2,209,507 | Campbell | July 30, 1940 |
| 2,389,025 | Campbell | Nov. 13, 1945 |
| 2,468,109 | Richardson et al. | Apr. 26, 1949 |
| 2,505,642 | Hugenholtz | Apr. 25, 1950 |
| 2,521,058 | Goldberg | Sept. 5, 1950 |
| 2,506,818 | Sziklai | May 9, 1950 |
| 2,513,477 | Gubin | July 4, 1950 |
| 2,513,528 | Sohon | July 4, 1950 |
| 2,574,482 | Hugenholtz | Nov. 13, 1951 |